(12) United States Patent
Taketani et al.

(10) Patent No.: US 6,731,344 B2
(45) Date of Patent: May 4, 2004

(54) HORIZONTAL AUTOMATIC FREQUENCY CONTROL (AFC) CIRCUIT

(75) Inventors: Nobuo Taketani, Hyogo (JP); Ryuichi Shibutani, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 388 days.

(21) Appl. No.: 09/901,850

(22) Filed: Jul. 9, 2001

(65) Prior Publication Data

US 2002/0041342 A1 Apr. 11, 2002

(30) Foreign Application Priority Data

Jul. 10, 2000 (JP) ........................................ 2000-208080

(51) Int. Cl.[7] ................................................. H03L 7/09
(52) U.S. Cl. ........................ 348/540; 348/497; 348/511
(58) Field of Search ......................... 348/497, 54, 536, 348/540; 386/48, 85, 91

(56) References Cited

U.S. PATENT DOCUMENTS 4,393,413 A * 7/1983 Kaneko ........................ 386/13
4,987,491 A * 1/1991 Kaite et al. .................. 348/497
6,018,408 A * 1/2000 Hong ........................... 359/201
6,441,860 B1 * 8/2002 Yamaguchi et al. ........ 348/555

FOREIGN PATENT DOCUMENTS

JP           01132284 A   *   5/1989   .......... H04N/05/95

* cited by examiner

Primary Examiner—Victor R. Kostak
(74) Attorney, Agent, or Firm—RatnerPrestia

(57) ABSTRACT

A horizontal automatic frequency control (AFC) used in a display having a display device such as a cathode ray tube (CRT) is provided. The AFC circuit reduces a horizontal distortion and horizontal jitter on the CRT. The AFC circuit includes a video signal processor for demodulating and converting an input video signal into a desired signal such as a YUV signal or an RGB signal, a synchronous separator for separating a synchronizing signal from the video signal, a dual-port line memory, an Hout generator for generating a horizontal driving pulse which drives a horizontal deflection yoke, a read clock generator for generating a read clock (RCK) signal which is synchronized in phase with a flyback pulse, and a horizontal deflection driver for controlling horizontal deflection of the CRT and generating the flyback pulse. The line memory absorbs a horizontal position change of a displayed image caused by a temperature change or a load change in the horizontal deflection driver.

12 Claims, 7 Drawing Sheets

HORIZONTAL AUTOMATIC FREQUENCY CONTROL (AFC) CIRCUIT

FIELD OF THE INVENTION

The present invention relates to a horizontal automatic frequency control (AFC) circuit in a horizontal deflection circuit for driving a cathode ray tube (CRT) and particularly to a horizontal AFC circuit designed for reducing a horizontal distortion and horizontal jitter on a CRT screen.

BACKGROUND OF THE INVENTION

A horizontal automatic frequency control (AFC) circuit is a primary circuit for driving a cathode ray tube (CRT) display. A conventional horizontal AFC circuit will be described referring to the relevant drawings.

FIG. 5 is a block diagram of the conventional horizontal AFC circuit. A video signal processor 301 demodulates and converts a video signal 309 received into a YUV signal or an RGB signal. A synchronous separator 302 separates a horizontal sync signal and a vertical sync signal from the video signal 309. An Hout signal circuit 304 is responsive to a horizontal (H) reference pulse 312 received from the synchronous separator 302 for generating a horizontal driving pulse 313 which drives a horizontal deflection driver 307. A video signal driver 306, upon receiving the YUV or RGB signal from the video signal processor 301, generates a video signal for driving a CRT 308. The horizontal deflection driver 307, in responsive to the horizontal driving pulse 313, controls horizontal deflection for the CRT 308. Also, the horizontal deflection driver 307 generates a flyback pulse 311. The H reference pulse 312 is synchronized with the video signal 309.

FIG. 7 is a block diagram of the Hout circuit 304. A counter 501 releases an H pulse 510 after a specific period of time from receiving the H reference pulse 312. An HSAW circuit 502 generates a ramp-up sawtooth waveform signal at an H rate from the H pulse 510. Another HSAW circuit 503 generates a ramp-up sawtooth waveform signal at an H rate from the H reference pulse 312. A comparator 504 compares the sawtooth signal 511 from the HSAW circuit 502 with a DC voltage 514 from a low pass filter (LPF) 508. When the sawtooth signal 511 is greater, the comparator 504 releases a high (H) level signal. Similarly to this, a comparator 505 compares the sawtooth signal 512 from the HSAW circuit 503 with the DC voltage 514 from the LPF 508. And when the sawtooth signal 512 is greater, the comparator 505 releases an H level signal. A reset/set (RS) flip-flop 506 is reset when the comparator 504 outputs the H level, thus turning the horizontal driving pulse 313 to a low (L) level. When the comparator 505 outputs the H level, the flip-flop 506 turns the horizontal driving pulse 313 to the H level. A multiplier 507 multiplies the flyback pulse 311 by the H reference pulse 312. An LPF 508 cuts off a high frequency component of an output 513 of the multiplier 507.

An operation of the conventional horizontal AFC circuit having the foregoing arrangement will be explained. FIG. 6 is a diagram illustrating the operation of the conventional horizontal AFC circuit. The synchronous separator 302 generates the H reference pulse 312 at horizontal rate from the video signal 309. The Hout circuit 304 retards the H reference pulse 312 for a specific time to generate the H pulse 510 and releases the horizontal driving pulse 313. The horizontal deflection driver 307, upon receiving the horizontal driving pulse 313, generates and releases the flyback pulse 311. The delay of the flyback pulse 311 from the horizontal driving pulse 313 may be varied depending on a temperature and a load. This variation causes a horizontal position change on the CRT 308.

For reducing the horizontal position change, the horizontal AFC circuit has the flyback pulse 311 synchronized in phase with the H reference pulse 312. The horizontal AFC circuit incorporates a loop circuit including a multiplier 507, an LPF 508, comparators 504 and 505, an RS flip-flop 506, and a horizontal deflection driver 307. In case that the flyback pulse 311 lags behind the H reference pulse 312, the multiplier 513 outputs a signal where a lower portion from the center in the wave amplitude is greater than an upper portion. This declines the DC voltage 514 and positions the horizontal driving pulse 313 earlier than the H reference pulse 312. As a result, a phase difference between the H reference pulse 312 and the flyback pulse 311 is eliminated, and thus the image on the CRT 308 does not move along the horizontal direction.

However, the conventional AFC circuit has the following disadvantage. When the Hout circuit 304 having an analog device is accompanied with a digital circuit in the video signal processor 301 and the synchronous separator 302, the circuit 304 may be influenced by a clock signal in the digital circuit and a change of a power source voltage. Accordingly, a jitter in the horizontal driving pulse 313 is hardly attenuated.

SUMMARY OF THE INVENTION

A horizontal automatic frequency control (AFC) circuit reducing a horizontal distortion on a cathode ray tube (CRT) and hardly be affected by a digital noise, thus declining horizontal jitter.

The AFC circuit includes the following components:

(a) A synchronous separator for generating a horizontal (H) reference pulse from a video signal;

(b) An Hout signal generator for generating, from an output of the synchronous separator, a horizontal driving pulse which drives a horizontal deflection yoke of the CRT;

(c) A horizontal deflection driver for controlling horizontal deflection of the horizontal deflection yoke in responsive to the horizontal driving pulse;

(d) A line memory into which each line of the video signal is written along a write clock (WCK) enabled, and from which the video signal is read out with a read clock (RCK) which is synchronized with the flyback pulse which determines the starting point being started from the flyback pulse; and (e) A read clock generator for generating the RCK from the flyback pulse.

DETAILED DESCRIPTION OF THE PREFERRED EMBODIMENTS

Figure 1:
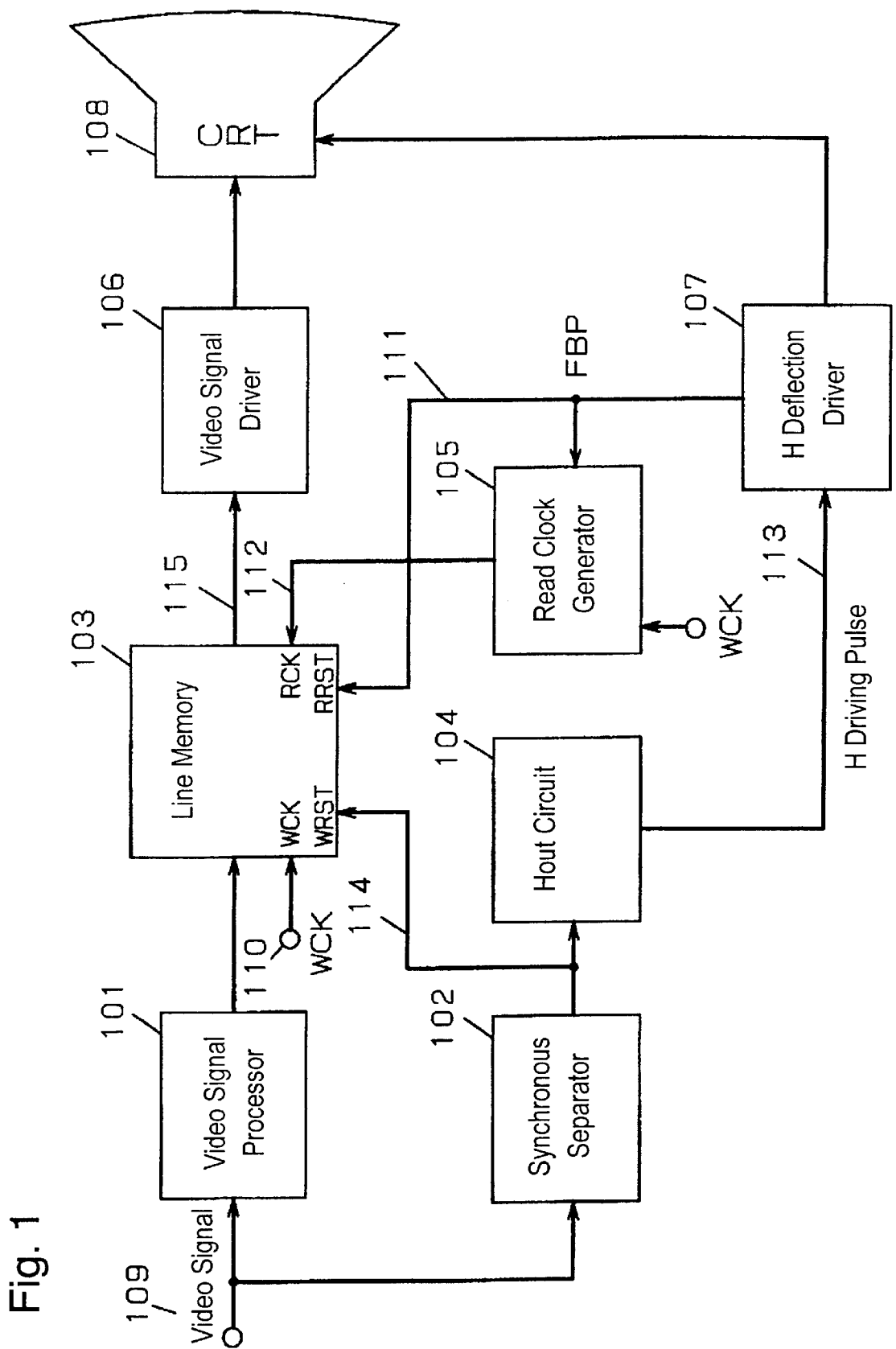
FIG. 1 is a block diagram of a horizontal automatic frequency control (AFC) circuit according to an exemplary embodiment of the present invention.

FIG. 1 is a block diagram of a horizontal automatic frequency control (AFC) circuit according to an exemplary embodiment of the present invention. A video signal processor 101 demodulates and converts a video signal received into a YUV signal or an RGB signal. A synchronous separator 102 separates a horizontal sync signal and a vertical sync signal from the video signal 109. A line memory 103 stores an output of the video signal processor 101. The line memory 103, in response to a horizontal (H) reference pulse signal 114 generated in the synchronous separator 102, starts writing the output with a write clock (WCK) 110. Also, the line memory 103, in responsive to a flyback pulse 111 received from a horizontal deflection driver 107, starts reading the output with a read clock (RCK) 112. The RCK112 is synchronized in phase with the flyback pulse 111 and received from a read clock generator 105. An Hout circuit 104, in responsive to the H reference pulse 114 from the synchronous separator 102, generates a horizontal driving pulse 113 which drives a horizontal deflection yoke. Upon receiving the flyback pulse 111 from the horizontal deflection driver, the read clock generator 105 generates the RCK 112 synchronized in phase with the flyback pulse 111. A video signal driver 106, upon receiving the signal 115 from the line memory 103, generates a video signal for driving a CRT 108. The horizontal deflection driver 107, in responsive to the horizontal driving pulse 113 from the Hout circuit 104, controls horizontal deflection of the CRT 108.

The WCK 110 is a clock signal synchronized with a chrominance subcarrier or a synchronizing signal in the video signal. The WCK 110 may be a free-run clock signal which is not synchronized with the chrominance subcarrier or synchronizing signal.

An operation of the horizontal AFC circuit according to this embodiment will be explained referring to FIGS. 1, 2, and 3.

Figure 3:
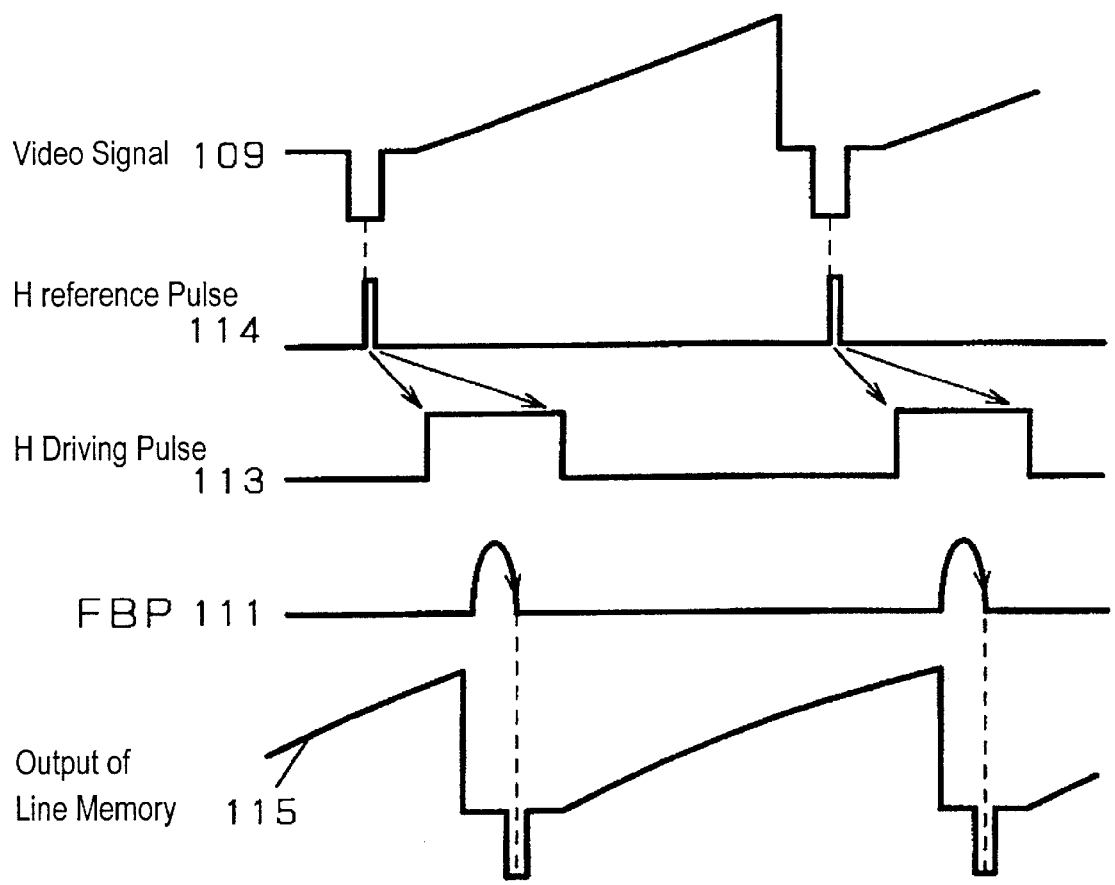
FIG. 3 is an explanatory diagram showing an operation of the horizontal AFC circuit according to the embodiment.

FIG. 3 is a diagram illustrating an operation in the circuit of the embodiment. The synchronous separator 102 generates and releases the H reference pulse 114 which is synchronized with the video signal 109. The Hout circuit 104 generates the horizontal driving pulse 113 which is retarded by a specific time. In response to the H reference pulse 114, the video signal is written into the line memory 103.

The horizontal deflection driver 107, upon receiving the horizontal driving pulse 113, generates and releases the flyback pulse 111. The video signal is read out from the line memory 103 in response to the falling of the flyback pulse 111. This allows the signal output 115 of the line memory 103 to be precisely synchronized in phase with the flyback pulse 111. As a result, an image displayed on the CRT 108 does not move along the horizontal direction even if a condition including a temperature and a load is varied.

Figure 2:
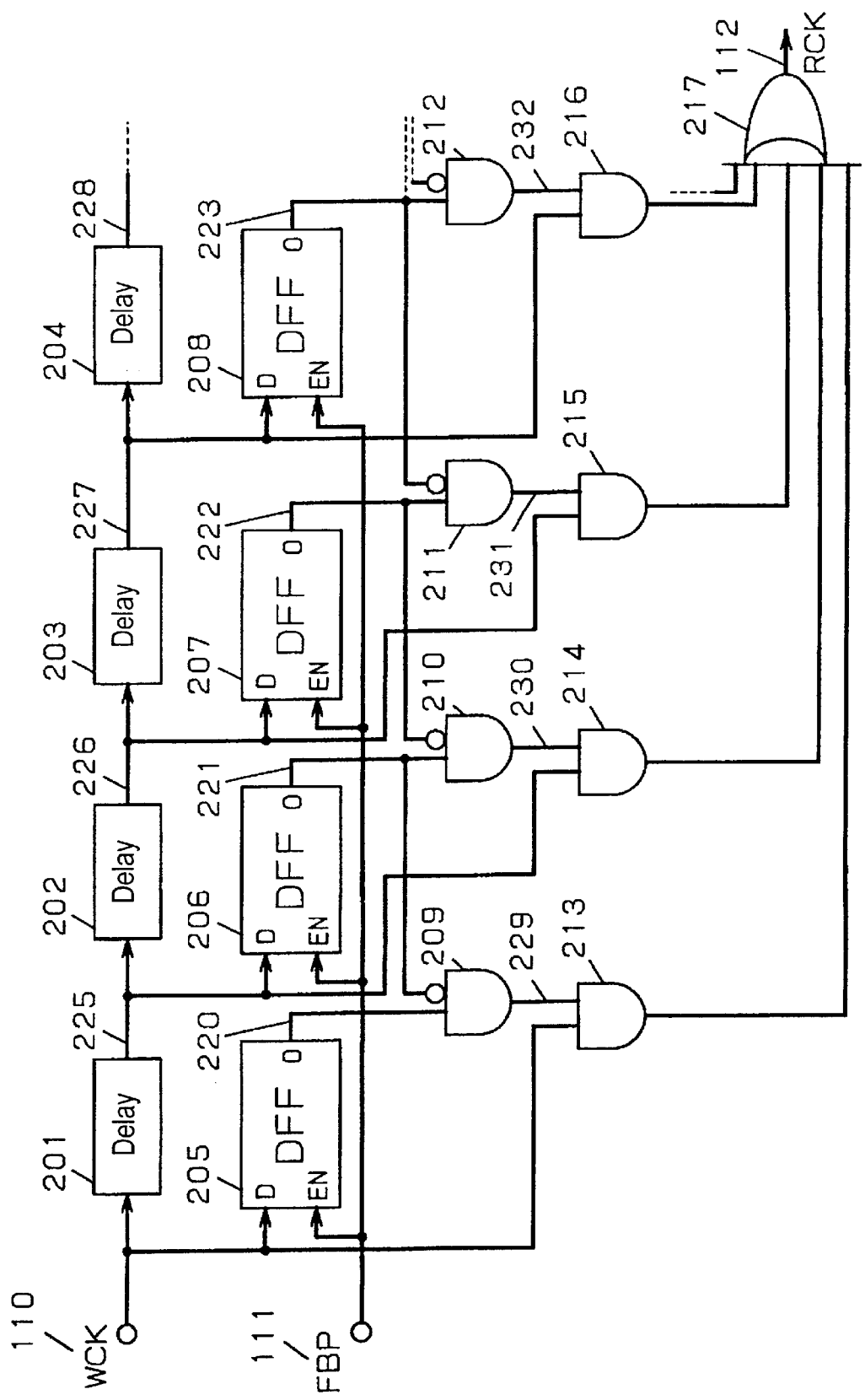
FIG. 2 is a block diagram of a read clock generator in the horizontal AFC circuit according to the embodiment.

FIG. 2 illustrates the RCK generator 105 for generating the RCK 112 from the flyback pulse 111. Delay circuits 201 through 204 retard an input signal by a specific time (e.g. ranging 1 to 4 ns). D flip-flops 205 to 208 retain an input signal (D) when an enable terminal (EN) turns from a high (H) level to a low (L) level. Single-inverted-input AND circuits 209 to 212 receives one of two inputs as it is and the other inverted for an AND logic operation. The RCK generator 105 includes AND circuits 213 to 216 and an OR circuit 217. The delay circuits 201 to 204 release signals 225 to 228. The D flip-flops 205 to 208 releases signal 220 to 223. The single-inverted-input AND circuits 209 to 212 release signals 229 to 232.

Figure 4:
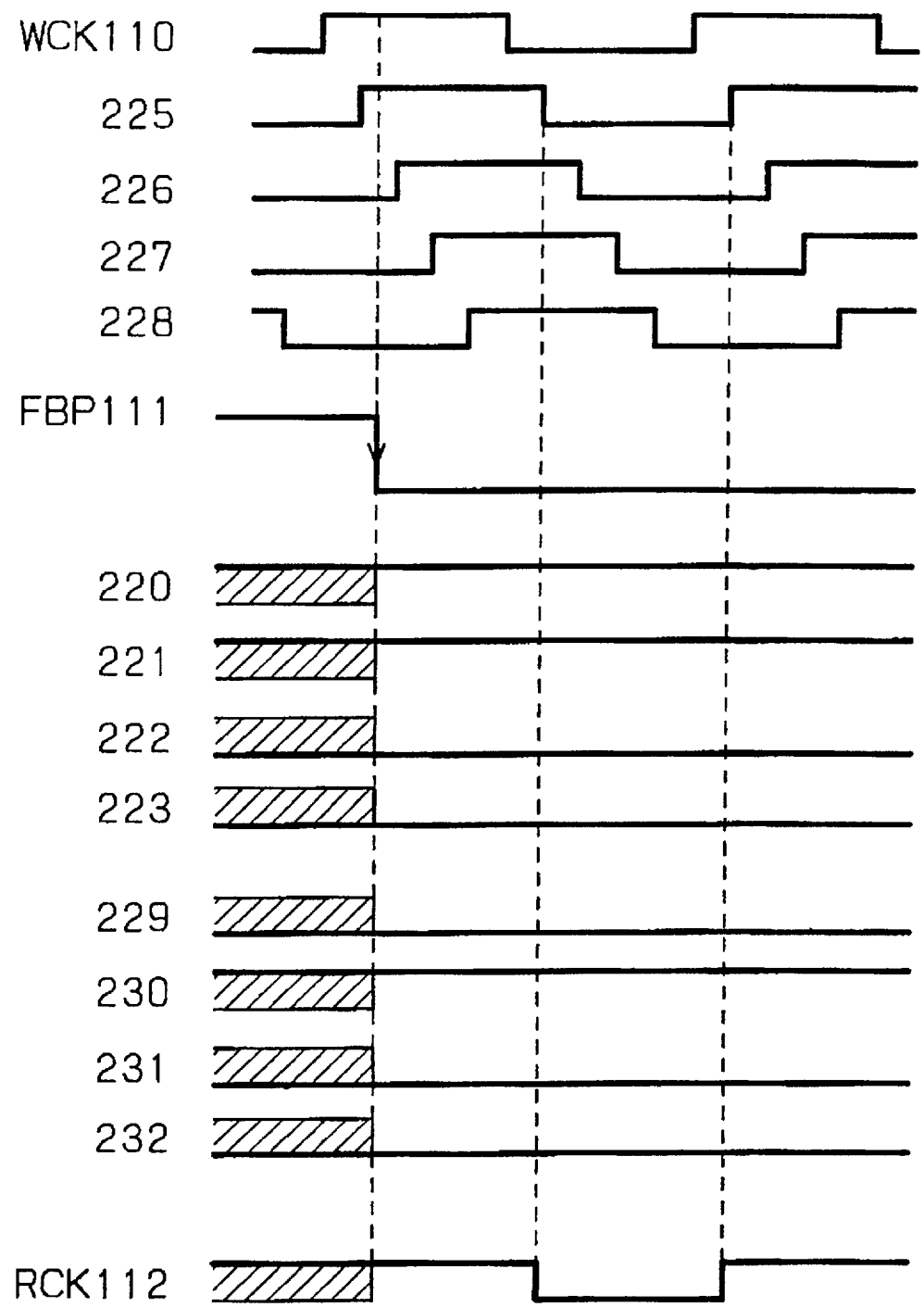
FIG. 4 is an explanatory diagram showing an operation of the read clock generator in the horizontal AFC circuit according to the embodiment.
Figure 5:
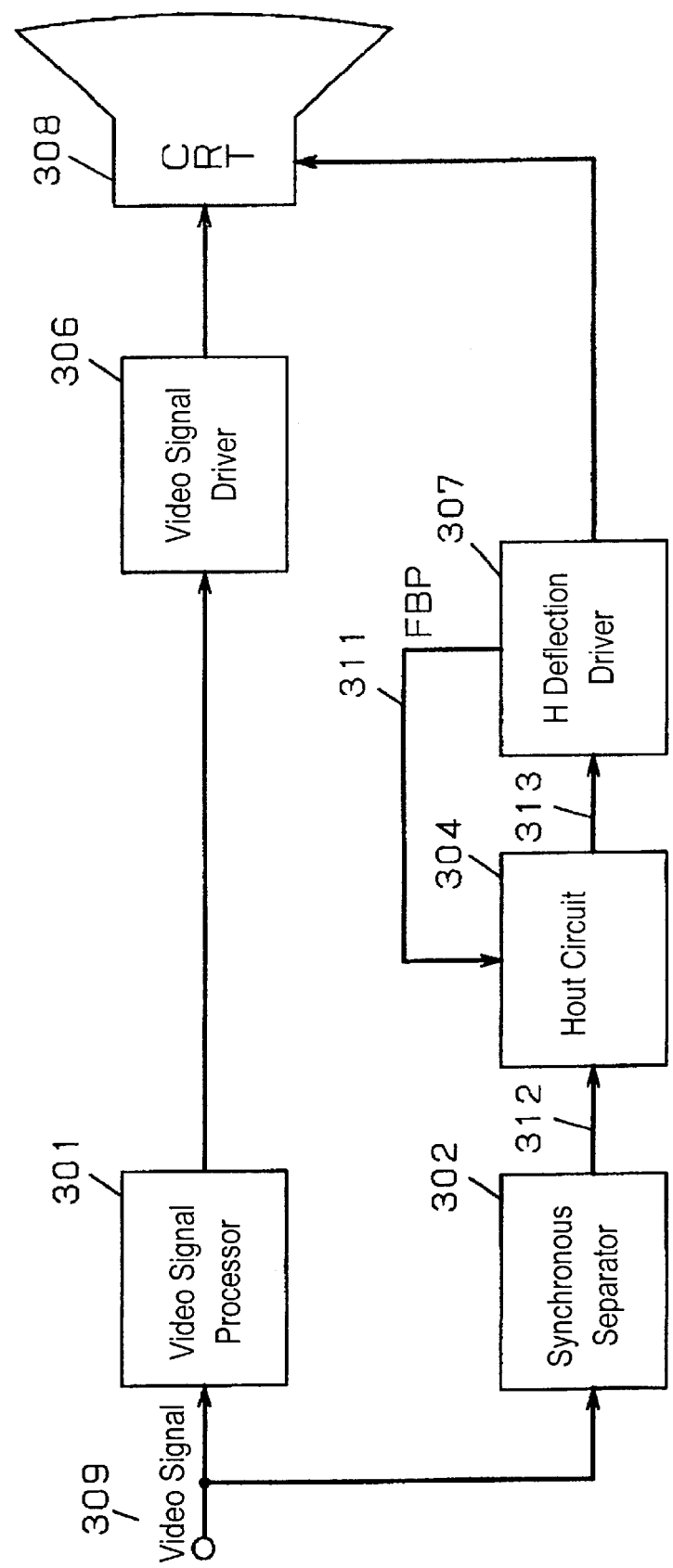
FIG. 5 is a block diagram of a conventional horizontal AFC circuit.
Figure 6:
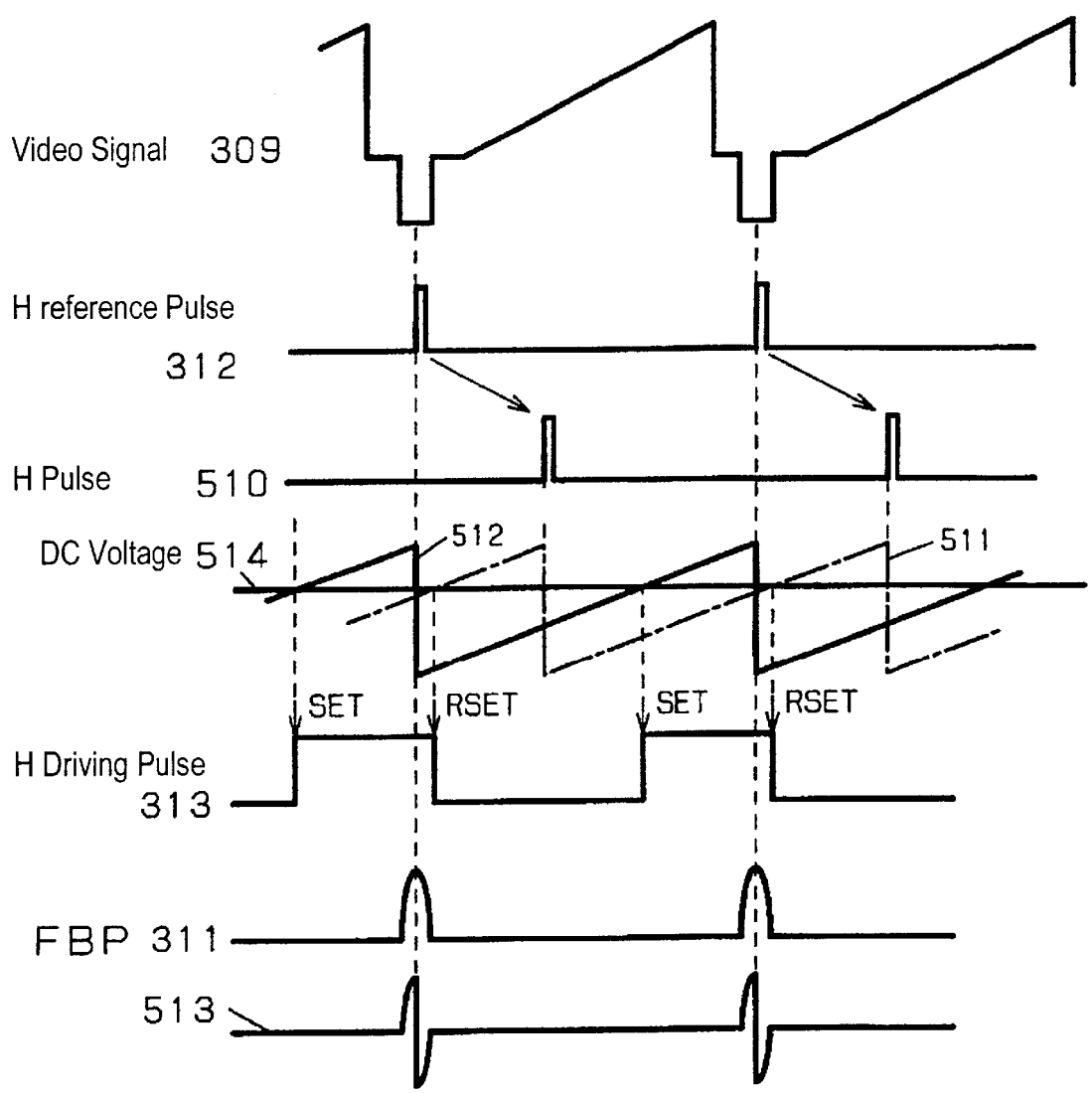
FIG. 6 is an explanatory diagram showing an operation of the conventional horizontal AFC circuit.
Figure 7:
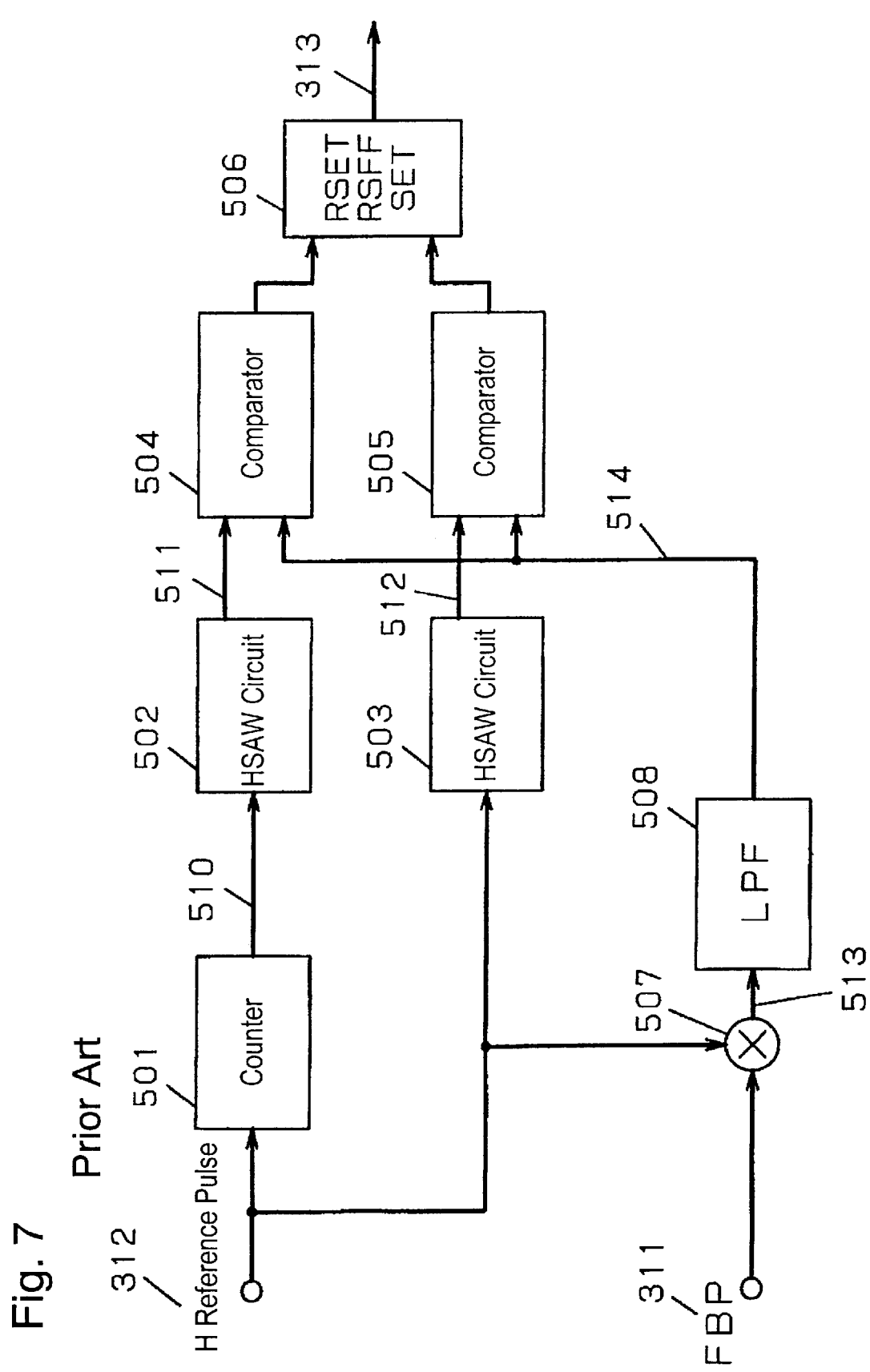
FIG. 7 is a block diagram of a conventional Hout circuit.

FIG. 4 illustrates an operation of the RCK generator 105. The product of a delay time and a number of the delay circuits is greater than the period of the write clock (WCK) 110. In FIG. 4, just four of the delay circuits 201 to 204 are shown for simplifying the explanation.

When the falling of the flyback pulse 111 is positioned between the rising of the signal 225 and the falling of the signal 226, the signal 221 becomes at the H level, and the signal 222 becomes at the L level regardless of a state before the falling of the flyback pulse 111. Therefore, only the output of the single-inverted-input AND 210 becomes the H level, thus selecting the signal 225 as the RCK 112. Then, the RCK 112 has a jitter ranging in the delay time of the delay circuit and thus is not always synchronized with the falling of the flyback pulse 111. The delay time in each of the delay circuits 201 to 204 ranges 1 to 4 ns, i.e. a few percent of the period of a display pixel clock. Therefore, an image on the CRT 108 does not substantially move along the horizontal direction.

As set forth above, the AFC circuit according to this embodiment includes only digital devices but not analog devices. Thus, horizontal distortion caused by a temperature change or a load change in the horizontal deflection driver can thus be absorbed by the line memory. As a result, the image displayed on the CRT does not exhibit a horizontal distortion and suffers less from a digital noise, hence declining horizontal jitter.

What is claimed is:

1. A horizontal automatic frequency control (AFC) circuit used in a display having a cathode ray tube (CRT) and a horizontal deflection yoke for performing horizontal deflection of the CRT, the display receiving a video signal and displaying the video signal on the CRT, said horizontal AFC circuit comprising:

a synchronous separator for generating a horizontal (H) reference pulse from the video signal;

an Hout circuit for generating, from an output of said synchronous separator, a horizontal driving pulse which drives the horizontal deflection yoke;

a horizontal deflection driver for driving, in responsive to the horizontal driving pulse, the horizontal deflection yoke to control the horizontal deflection of the CRT and for generating a flyback pulse;

a line memory into which each line of the video signal is written with a write clock (WCK) from the H reference pulse, and from which the written video signal with a read clock (RCK) synchronized with the flyback pulse from the flyback pulse; and a read clock generator for generating the RCK from the flyback pulse and the WCK.

2. The horizontal AFC circuit according to claim 1, wherein each line of the written video signal is started reading out from said line memory at the falling of the flyback pulse.

3. The horizontal AFC circuit according to claim 1, wherein said read clock generator changes a phase of the WCK for generating the RCK according to a phase difference between the flyback pulse and the WCK.

4. The horizontal AFC circuit according to claim 1, wherein said read clock generator comprises:

a multiple-phase clock generator for generating, from the WCK, a plurality of clock signals having different phases from each other; and a selector for selecting one of the clock signals as the RCK according to the phase difference between the WCK and the flyback pulse.

5. The horizontal AFC circuit according to claim 4, wherein said multiple-phase clock generator includes a delay circuit receiving the WCK, and wherein the selector selects one signal of the WCK and an output of the delay circuit according to the phase difference between the WCK and the flyback pulse and releases the one signal as the RCK.

6. The horizontal AFC circuit according to claim 4, wherein said multiple-phase clock generator includes a plurality of delay circuits coupled in series, a top delay circuit of said delay circuits receiving the WCK, and wherein said selector selects one signal of the WCK and outputs of said delay circuits according to the phase difference between the WCK and the flyback pulse and releases the one signal as the RCK.

7. The horizontal AFC circuit according to claim 1, further comprising a video signal processor for demodulating and converting the video signal into one of a YUV signal and an RGB signal, wherein an output of said video signal processor is written into said line memory, and the written output is read out from said line memory.

8. The horizontal AFC circuit according to claim 1, further comprising a video signal driver for generating a video signal driving the CRT from an output of said line memory.

9. The horizontal AFC circuit according to claim 1, wherein the WCK is synchronized with the H reference pulse.

10. The horizontal AFC circuit according to claim 1, wherein the WCK is a free-run clock signal not being synchronized with the H reference pulse.

11. The horizontal AFC circuit according to claim 1, wherein the video signal contains a chrominance subcarrier, and the WCK is synchronized with the chrominance subcarrier.

12. The horizontal AFC circuit according to claim 1, wherein the video signal contains a chrominance subcarrier, and the WCK is a free-run clock signal not being synchronized with the chrominance subcarrier.

* * * * *